Nov. 19, 1929.  H. W. CLARK  1,736,727
TIRE RIM TOOL
Filed Dec. 9, 1927  2 Sheets-Sheet 1

INVENTOR.
H. W. Clark
BY
ATTORNEY

Patented Nov. 19, 1929

1,736,727

UNITED STATES PATENT OFFICE

HAROLD W. CLARK, OF ALLIANCE, OHIO, ASSIGNOR TO THE BUCKEYE JACK MANUFACTURING COMPANY, OF ALLIANCE, OHIO

TIRE-RIM TOOL

Application filed December 9, 1927. Serial No. 238,829.

My invention relates to an improvement in tire rim tools for use in removing or applying demountable rims used in connection with tires.

In the process of removing a tire from a demountable rim, it is necessary to collapse the rim which is in the form of a heavy split steel ring, allowing the ends to slip past each other and thus release the rim from the tire. In applying a rim to a tire, it is necessary to reverse the process and to expand the ring so that the two ends will resume their relative position and be locked in place to form a complete ring or circle.

Owing to the rigid nature of the rim, it is not practicable to attempt to apply or remove a rim without the use of a special tool for the purpose.

The object of my invention is to provide a tool so constructed and operated that the ends of the rims may be released relatively to each other and held in any desired position, and replaced easily as may be required in applying or removing the tire, without permanently distorting the rim.

In the accompanying drawings forming part of this specification,—

Figure 1:
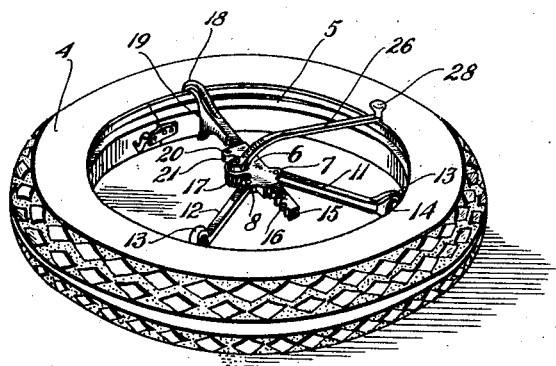
Fig. 1 is a perspective view of a demountable rim with a tire mounted thereon and my tire rim tool engaging the same.
Figure 2:
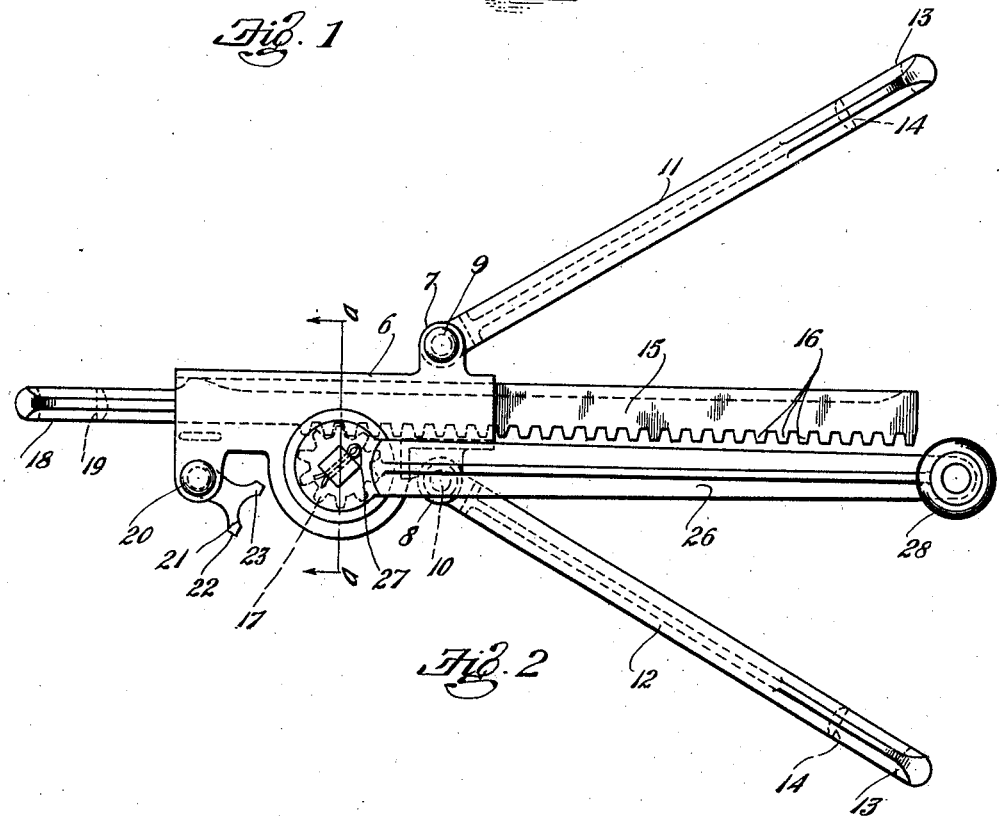
Fig. 2 is a plan view of my tool.
Figure 3:
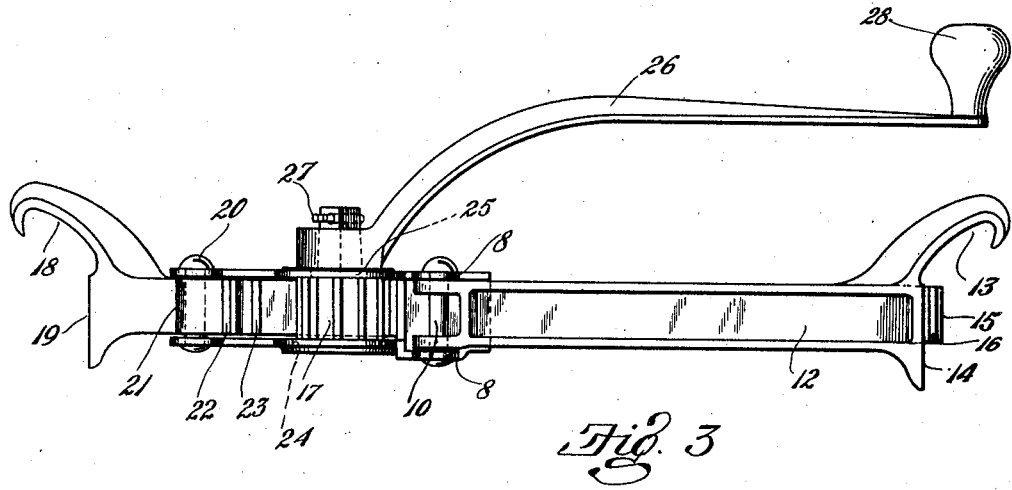
Fig. 3 is a side elevation of my tool.
Figure 4:
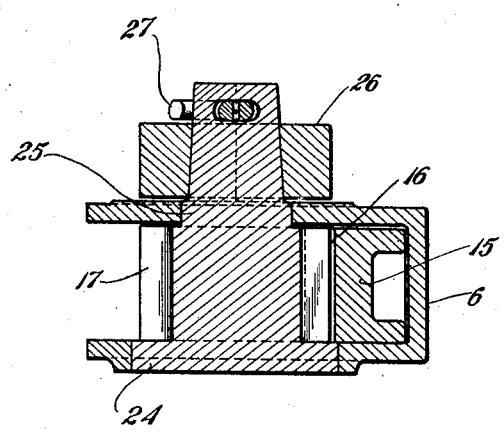
Fig. 4 is a cross section taken on line a—a, Fig. 1, through pinion.

Referring to the drawings, 4 designates a tire of one of the well known forms for use on automobiles or other vehicles, mounted on a split rim 5, the two ends of which are normally held together when in place in the tire by a lug or any other suitable means. 6 represents the main frame of my tool, which I prefer to make in one piece. Frame 6 is provided with three pairs of lugs of which the ones designated as 7 and 8 provide means for supporting the pins 9 and 10, on which are journalled arms 11 and 12.

At the end of each of the arms 11 and 12, I provide a hook 13 which projects beyond the face 14 at the end of the arm and is arranged to hook over the rim for the purpose of gripping the rim in the process of contracting the rim for removing it. The face 14 at the end of the arms is constructed to abut against the inner surface of the tire rim when the tool is being used to expand the rim into normal position within the tire.

Slidably mounted in frame 6, I provide rack bar arm 15, which is provided on one side with teeth 16, which engage similar teeth in pinion 17. The rack bar arm 15 carries at its outer end hook 18, and expanding face 19, similar in form to those on the movable arms 11 and 12. Mounted on pin 20, supported by main frame 6, is pawl 21. This pawl is of the double acting type, with two teeth 22 and 23, and is constructed so that it can be thrown into engagement with rack teeth 16, to hold the rack bar arm from retrograde movement by the force exerted by the rim either during the process of expanding or the process of contracting the rim. Thus the pawl forms a locking device to hold the rim in any desired position.

Pinion 17 is provided with bearings 24 and 25, which are journalled respectively in the lower and upper members of the frame 6. It will be observed that I prefer to make the lower journal 24 larger in diameter than upper journal 25, so that the pinion may be inserted into the frame from the bottom and held in this place by means of one fastening, as later described, and also so that a large wearing area is provided at the lower end of the pinion to support the pinion against the large force exerted at its upper part, which I make of tapered square form to receive handle 26 and prevent it from turning with reference to the pinion. I provide split pin 27 or other similar means to hold handle 26 in place. Handle 26 is provided at its outer end with hand grip 28 for convenience of the operator.

In operation, the rim to be contracted for removal of tire is gripped in three places by hooks 13 and 18. The tool is preferably so placed within the rim that hook 18 is located near one of the split ends of the rim. The handle 26 is then turned so as to pull the hook 18 in toward the frame of the tool, thus pulling the rim end inward and releasing it from the other end of the rim, thus allowing the ends to slip past each other and the tire may then be easily slipped off the rim.

In replacing the rim within the tire, the rack arm is withdrawn to a point where the contact faces 14 and 19 will abut against the inner face of the rim to be expanded. The handle is then turned in the reverse direction and the rack arm forced outward, thus expanding the rim until the two split parts lock together and the rim is in the proper position within the tire. In either operation described, pawl lock 21 can be thrown into engagement with the rack teeth to hold the rack against retrograde movement due to the spring action set up by the rim.

It will be observed that with my tool I grasp the rim at three points, so that the forces set up by the tool are distributed about the rim so as to give the greatest power and yet prevent any permanent set or distortion in the rim. In applying the tool to the work it is unnecessary to locate the tool carefully, as is the case with the tools where only two hooks are used and the tool must be placed directly over the center of the rim to prevent the tool from slipping off. It will also be seen that by making the pinion integral with its shaft and bearings I provide great strength and rigidity at the points where the greatest strain and wear occur.

Having fully explained my invention, what I claim as new and desire to secure by Letters-Patent is:—

1. In a device of the character described, a frame having opposite side walls and forming a guideway, a toothed rack slidably mounted in said guideway, oppositely disposed bearing apertures in said walls, one of the apertures being of larger diameter than the other, a pinion element comprising a pinion engaging the rack and having large and small cylindrical portions arranged at its ends, the pinion element also comprising a projection extending from one of the cylindrical portions, the larger cylindrical portion being of greater diameter than the pinion and journalled in the larger one of the bearing apertures, the smaller one of the cylindrical portions being journalled in the smaller one of the bearing apertures, and a handle fixed to the projection.

2. In a device of the character described, a frame having opposite side walls and forming a guideway, a toothed rack slidably mounted in said guideway, oppositely disposed bearing apertures of different diameters in said walls, a pinion element comprising a pinion engaging the rack and having large and small cylindrical portions arranged at its ends, the pinion element also comprising a projection extending from the smaller one of the cylindrical portions, the larger cylindrical portion being of greater diameter than the pinion and journalled in the larger one of the bearing apertures, the smaller one of the cylindrical portions being journalled in the smaller one of the bearing apertures, and a handle fixed to the projection and securing the pinion element to the frame.

In testimony whereof, I have signed this specification.

HAROLD W. CLARK.